March 18, 1941.　　　　G. A. GILLEN　　　　2,235,151
ELECTRICAL MACHINE
Filed June 16, 1937　　　　2 Sheets-Sheet 1

GEORGE A. GILLEN
INVENTOR

BY
ATTORNEY

March 18, 1941.    G. A. GILLEN    2,235,151
ELECTRICAL MACHINE
Filed June 16, 1937    2 Sheets-Sheet 2

Inventor:
George A. Gillen,
Philip S. McLean
Attorney.

Patented Mar. 18, 1941

2,235,151

UNITED STATES PATENT OFFICE 2,235,151

ELECTRICAL MACHINE

George A. Gillen, Bronx, N. Y.

Application June 16, 1937, Serial No. 148,539

4 Claims. (Cl. 172—36)

The invention here disclosed relates to electrical machines in the nature of motors and generators.

Special objects of the invention are to provide a machine, the parts of which can be inexpensively produced and readily assembled.

Other objects and the novel features of construction, combinations and relations of parts by which the objects are realized will appear and are set forth in the following specification.

The drawings accompanying and forming part of the specification illustrate practical commercial embodiments of the invention, but it will be understood that further modifications and changes in structure may be made all within the true intent and broad scope of the invention.

The machine of the present invention is of the same general type as that covered in the copending Gillen patent application Ser. No. 112,625 filed November 25, 1936, and involving a rotor with bar magnets having segmental poles with exposed arcuate faces opposed to the arcuately curved poles of U-shaped field magnets in the stator. In this invention, the rotor and the stator are made up in halves, which can be put together with the rotor and stator windings entered and held in position between such halves.

Figure 1:
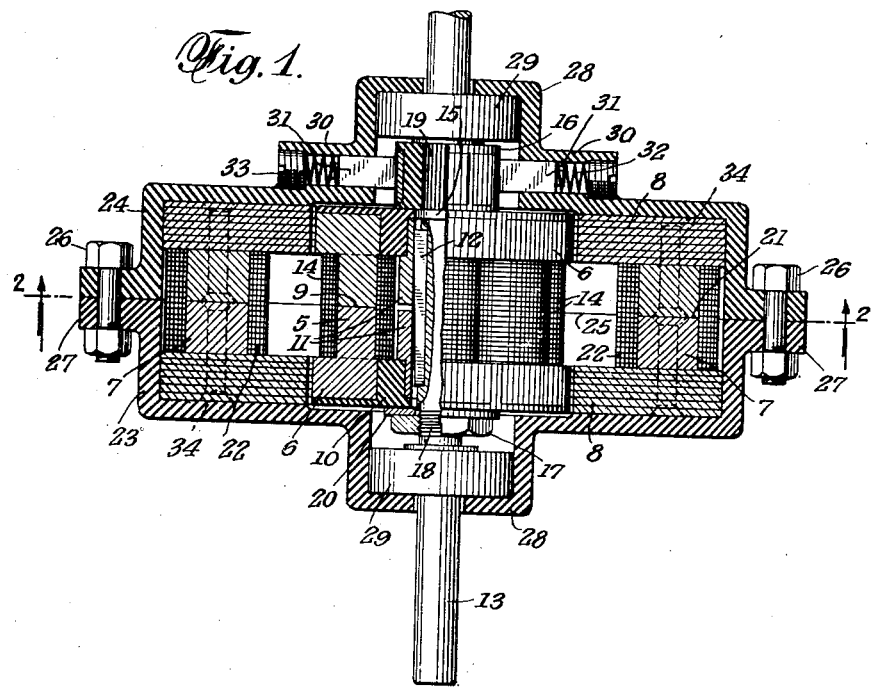
Fig. 1 is a broken sectional view of one of the machines, the sectioned portions appearing as on substantially the central horizontal plane of the machine.
Figure 2:
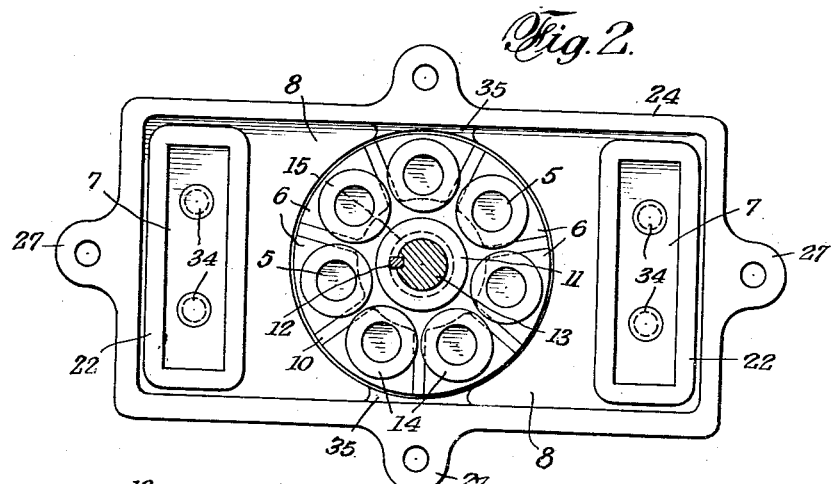
Fig. 2 is a part sectional view taken through the vertical central plane of the machine, as on line 2—2 of Fig. 1.

In Figs. 1 and 2, the bar magnets of the rotor are indicated at 5, having at opposite ends segmental polar extensions 6, with arcuate outer faces forming portions of a common circle.

The stator or field magnets are shown at 7, as of general U-form, having end polar projections 8, arcuately curved to closely overstand the exposed arcuate tips 6, of the rotor.

The cores 5, of the rotor magnets are separated on a division line indicated at 9, which may be and is shown in the present instance at the central vertical plane of the machine. The separate halves of the magnet cores are supported in molded insulation indicated at 10, in the nature of discs, in which the segmental poles 6, are embedded. These disc-like insulating supports are shown as of completely circular form, covering the ends of the poles and extending in between adjoining poles, but leaving the outer arcuate faces of the poles uncovered and exposed to the concavely curved field poles. In the present disclosure, these insulating discs are molded about sleeves or bushings 11, having keyways to receive the key 12, on the shaft 13. By such means, the two sections of the rotor are keyed to the shaft and secured with the halves of the magnet cores in register.

The windings for the rotor magnets are indicated at 14. These preferably are pre-formed coils which can be slipped into position between the halves of the magnet cores before the sections of the rotor are set up in fixed relation.

In the construction illustrated, the two sections of the rotor are secured between relatively fixed and adjustable abutments on the armature shaft. The fixed abutment is provided by a shoulder 15, on the shaft and the adjustable abutment by the nut 17, engaged with a screw-threaded portion 18, of the shaft.

In this particular showing, a commutator 16, is keyed on the shaft by forcing it over the longitudinally fluted or cut portion 19, of the shaft against one side of the shaft flange 15. The coils 14, may be slipped into position over the core projections either before or after the armature sections are located on the shaft. A washer 20, may be interposed between the tightening nut 17, and the face of the adjacent rotor section to save wear on the insulation as the sections are forced up tight against the other side of the stop flange 15.

The U-magnets of the field are similarly separable on a center line 21, and the windings for the pole pieces are in the form of coils 22, which will slip over the registering ends of companion pole sections.

The field sections are shown as embedded in molded insulation, shaped to form the two halves 23, 24, of a casing meeting on the center line 25, and secured together as by bolts 26, extending through lugs 27, at the meeting faces. These casing sections are shown as chambered at 28, to carry the shaft bearings 29, and section 24, as further formed with guides 30, for the commutator brushes 31. These guide passages at the outer ends receive the commutator springs 32, and spring adjusting abutment plugs 33. These plugs serve as closures for the brush guides as well as adjustable abutments for the springs and may be utilized further as terminals for the external wiring.

Figure 4:
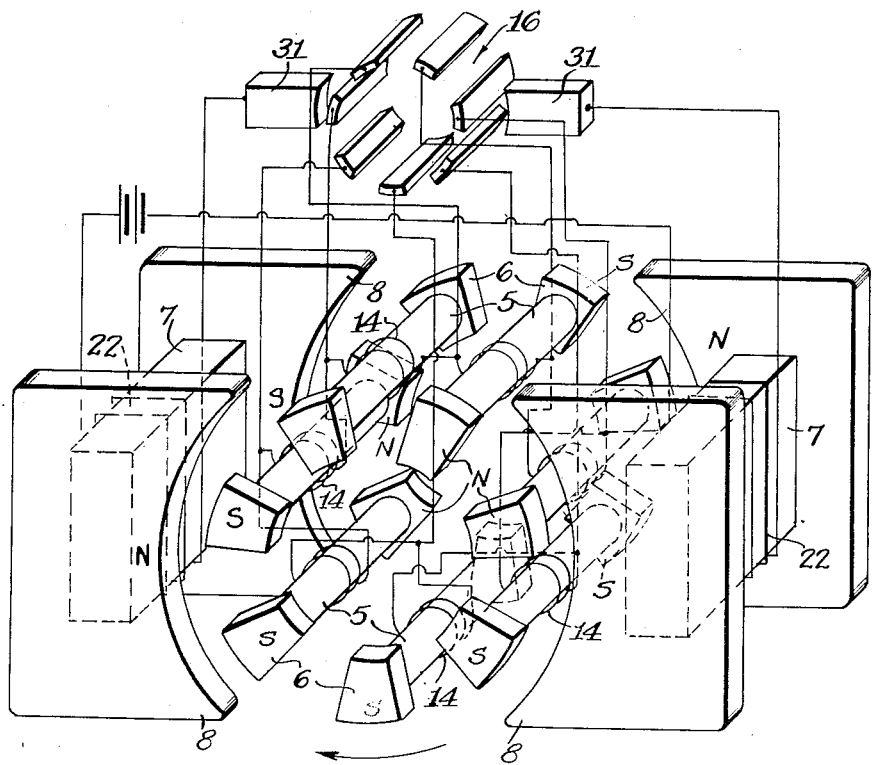
Fig. 4 is a wiring diagram.

For operating as a motor the coils may be connected as indicated in Fig. 4, that is, with the field coils 22, in series with each other and with the brushes 31, and with one end of one rotor coil and the opposite end of an adjoining coil both connected with a commutator segment. This accomplishes constant polarization of the field, with a north pole of one field magnet opposite a south pole of the other field magnet and a south pole of the first magnet opposite a north pole of the second magnet; and successive polarization of the rotor magnets with all the poles above the center line energized north at one end of the motor and south at the opposite end of the motor and those poles below the center line south at said first mentioned end of the motor and north at the opposite end of the motor, thus to cause each field pole to attract the approaching poles and repel the receding poles, substantially as indicated in the diagram.

Figure 3:
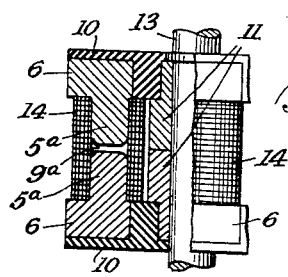
Fig. 3 is a broken sectional detail illustrating a modification of the structure.

It is not essential that the sections of the magnet cores physically contact for, as shown in Fig. 3, the core sections 5a, may have a space at the plane of separation between the same, substantially as indicated at 9a. This gap usually will be less than the combined width of the two magnetic gaps at the ends of the magnets. As shown in Fig. 3, the bushing elements 11, which may be of brass or other non-magnetic material may actually abut to mechanically determine the extent of the gap 9a, between the magnet core sections. This gap form of magnet core may be used in the field structure, as well as in the rotor. In some instances, it may be desirable to somewhat point or reduce the opposing ends of the core pieces as in Fig. 3, to concentrate the flux at the center of the coil.

The two part magnet may be molded in non-ferrous alloys, as well as in plastic insulating materials, though the latter may be considered desirable, particularly for constructions like that shown in Fig. 1, where the material of the casing is formed with the passages 30, to provide insulating guides for the brushes. The two halves of the rotor may be exact duplicates, making only one set of molds necessary for the rotor. The magnet cores and pole pieces may be solid or laminated or partly both solid and laminated. In the illustration, the smaller, rotor magnet cores are shown as solid pieces and the stator magnet cores are shown as solid members with laminated shaped pole pieces attached by rivet fastenings 34. As shown in Fig. 2, the molded base material of the casing sections may extend in between the opposite polar tips, as indicated at 35, to fixedly hold and space the poles of the opposing field magnets. While only two such magnets are shown, four or more field magnets may be employed.

The structure is such that any heat generated in the machine is readily dissipated. Particularly is this so when the parts are die cast in non-ferrous metals, for the metal then may be chosen for its heat dissipating qualities. While the line of separation has been shown as at the center of the machine, it will be apparent that the line of separation may be to one side of the center. For example, the line of separation may be made at the polar projections. It is intended that this and other variations be comprehended in the claims following.

What is claimed is:

1. Electrical apparatus of the character disclosed, comprising cooperating rotor and stator, each including magnet cores and energizing windings therefor, said magnet cores being composed of separate opposed core sections, means being provided for securing the opposed core sections together and surrounded by the magnetizing windings, said core pieces of the rotor being embedded in supporting discs molded about the polar projections of the same and the pole pieces of the stator being embedded in molded casing sections which meet on the plane of separation between the core parts of the stator magnets.

2. Electrical apparatus of the character disclosed, comprising cooperating rotor and stator, said rotor having magnets with cores composed of separate opposed magnetic sections and energizing windings about the opposing portions of said separate core sections, said core sections having polar extensions at the ends of the same and supporting members molded about said polar projections.

3. Electrical apparatus of the character disclosed, comprising cooperating rotor and stator, said rotor having magnets with cores composed of separate opposed magnetic sections and energizing windings about the opposing portions of said separate core sections, said core sections having polar extensions at the ends of the same and supporting members molded about said polar projections, end-to-end opposed bushings molded in said supporting members, a shaft for the rotor and means for securing said bushings in said opposing relation on said shaft.

4. An electrical machine, comprising stator and rotor, said rotor consisting of a shaft having a shouldered portion and fluted at one side of said shouldered portion, a commutator forced over said fluted portion of the shaft into engagement with said shouldered portion and a rotor body in separate cooperating sections secured on the shaft against the opposite side of said shouldered portion.

GEORGE A. GILLEN.